United States Patent
Fritsch et al.

(10) Patent No.: US 6,627,077 B2
(45) Date of Patent: Sep. 30, 2003

(54) MULTI-PART FILTER COMBINATION

(75) Inventors: Siegfried Fritsch, Sonthofen (DE); Guenther Schnalzger, Blaichach (AT); Michael Krauter, Untermaiselstein (DE); Peter Zimmermann, Ilsfeld (DE); Alexander Bareiss, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 10/054,869

(22) Filed: Jan. 25, 2002

(65) Prior Publication Data

US 2002/0096465 A1 Jul. 25, 2002

(30) Foreign Application Priority Data

Jan. 25, 2001 (DE) .......................... 101 03 284

(51) Int. Cl.[7] .................. B01D 35/02; F16K 31/06; F16K 51/00
(52) U.S. Cl. ................ 210/232; 210/314; 210/316; 210/318; 210/418; 210/429; 210/430; 210/432; 137/545; 137/549; 137/550; 264/138; 264/DIG. 48
(58) Field of Search .................. 210/232, 314, 210/316, 318, 418, 429, 430, 432; 137/545, 549, 550; 264/138, DIG. 48

(56) References Cited

U.S. PATENT DOCUMENTS

| 3,970,490 A | * | 7/1976 | Raines et al. |
| 5,887,956 A | * | 3/1999 | Rausch |
| 5,934,766 A | * | 8/1999 | Feigel et al. |
| 6,084,493 A | * | 7/2000 | Siegel |

FOREIGN PATENT DOCUMENTS

EP  679823  * 11/1995

* cited by examiner

Primary Examiner—Thomas M. Lithgow
(74) Attorney, Agent, or Firm—Ronald E. Greigg

(57) ABSTRACT

A multi-part filter combination is received in a stepped bore of a fluid-carrying component. A larger-diameter filter part is associated with a larger-diameter bore portion, and a smaller-diameter filter part is associated with a smaller-diameter bore portion. The two filter parts of the filter combination are connected by a connecting part. When the two filter parts are joined in their respective final position in the bore, this connecting part is detachable by means of a die to be introduced into the bore. The filter combination can be used in a valve block serving to receive a magnet valve.

5 Claims, 2 Drawing Sheets

MULTI-PART FILTER COMBINATION

BACKGROUND OF THE INVENTION

1. Field of the Invention

The invention is based on a multi-part filter combination, disposed in a stepped bore of a fluid-carrying component.

2. Description of the Prior Art

One multi-part filter combination is known from European Patent Disclosure EP 0 679 823 A1; it is used in conjunction with an electromagnet valve. This magnet valve has a body which is received in a stepped bore of a valve block. Two fluid-carrying lines extend in a larger-diameter bore portion; one fluid-carrying line is connected to the bottom of a smaller-diameter bore portion. A seat valve which communicates with the lines is located in the body of the magnet valve. To protect the seat valve from foreign bodies, the body of the magnet valve is provided with two filter parts: An essentially disklike filter part is placed on the body on the face end at the point where the line discharges into the smaller-diameter bore portion; a sleevelike filter part surrounds the body in the region of the larger-diameter bore portion, at the point where the two fluid-carrying lines discharge. In this known filter combination, two assembly operations are required to position the two filter parts on the body of the magnet valve. Furthermore, additional provisions are necessary, particularly for the disklike filter part, in order to keep it in its position until the magnet valve body has been installed in the valve block. This makes the production of the magnet valve more expensive.

OBJECTS AND SUMMARY OF THE INVENTION

The filter combination according to the invention has the advantage over the prior art that manipulating and installing the filter combination is reinforced and simplified since the two filter parts are first connected to one another. Incorrect installation from wrongly oriented filter parts is thus largely precluded. It is also advantageous that the severing of the filter parts and their placement in their respective final positions can be automated, which substantially enhances the safety of the installation process.

The provision according to one embodiment is especially advantageous, since it substantially simplifies and speeds up the installation.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENTS

Figure 1:
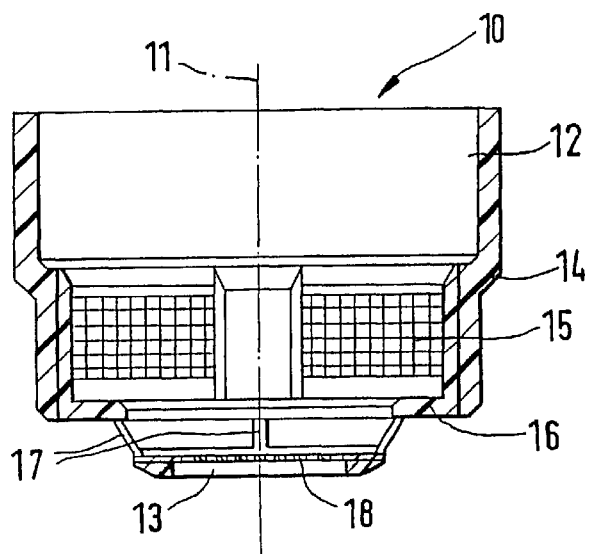
FIG. 1 shows a filter combination comprising two filter parts connected to one another.

A cup-shaped filter combination 10, shown in section in FIG. 1, is embodied as essentially rotationally symmetrical about its longitudinal axis 11 and comprises a sleevelike larger-diameter filter part 12 and a disklike smaller-diameter filter part 13. The filter part 12 forms a jacket 14 with a partly injected and partly exposed filter cloth 15 and a radially inward-oriented bottom ring 16 of the multi-part filter combination 10. The disklike filter part 13 is also part of the bottom of the filter combination 10 and is connected by means of a connecting part, in the form of a plurality of ribs 17 of small cross section, to the bottom ring 16 of the filter part 12. In a departure from the exemplary embodiment shown, the connecting part can also be embodied in the form of an encompassing wall of slight thickness, extending between the bottom ring 16 and the filter part 13. A peripherally injected filter cloth 18 is received in the filter part 13. The filter parts 12 and 13 and the connecting ribs 17 comprise a thermoplastic plastic; the filter cloths 15 and 18 are formed by a screen cloth made of plastic or metal threads.

Figure 3:
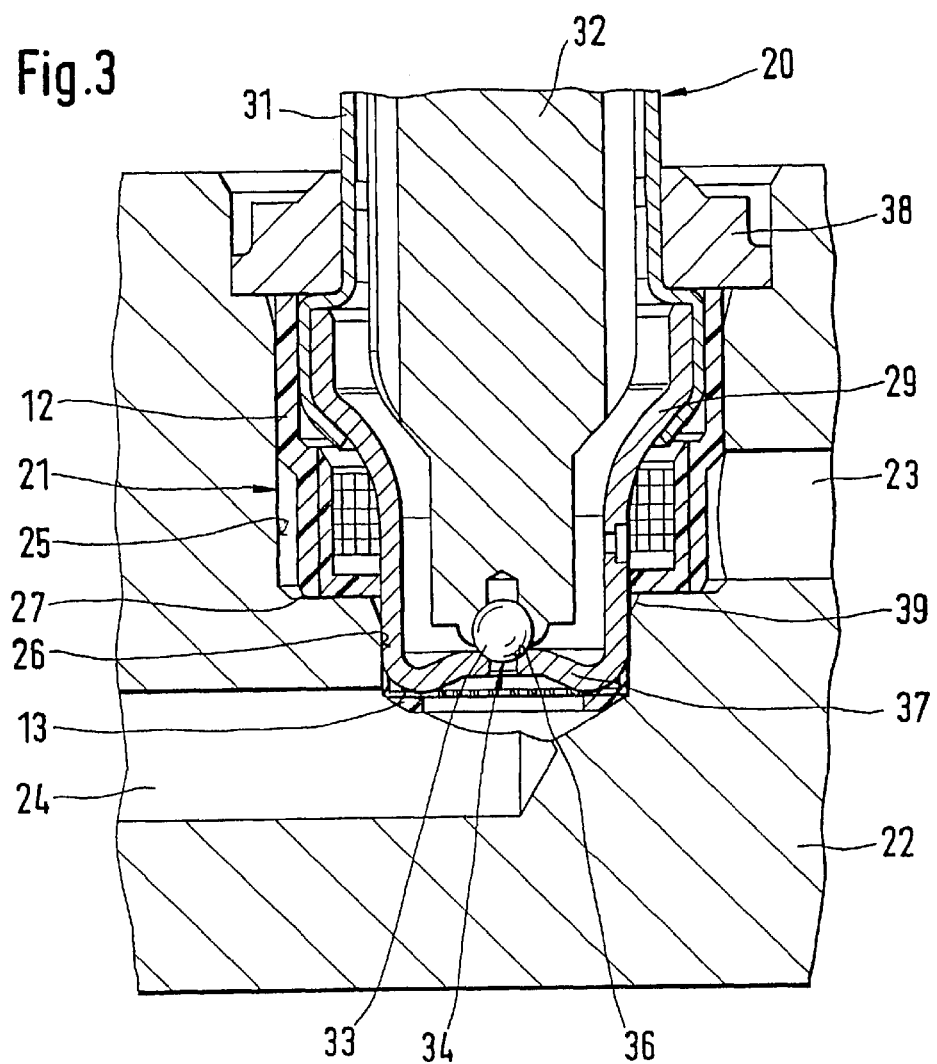
FIG. 3 shows the filter parts, severed from the workpiece and positioned in their final position, of the filter combination.
Figure 2:
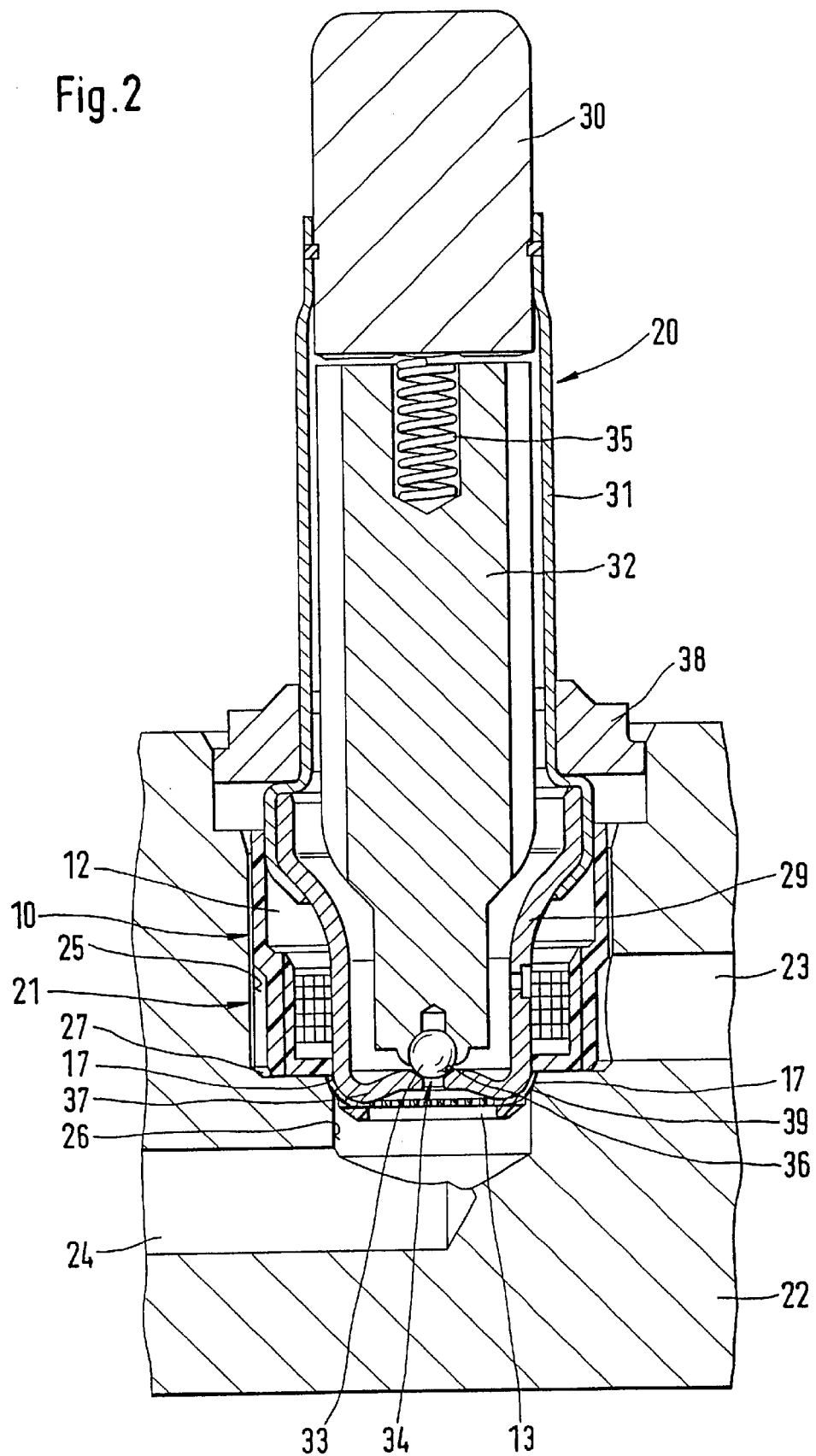
FIG. 2 shows the filter combination, received on a workpiece and joined into a bore.

The filter combination 10 is to be joined, as is the hydraulic part 20 of a magnet valve, shown in FIGS. 2 and 3, into a stepped bore 21 of a valve block 22. The valve block 22 is a fluid-carrying component and to that purpose has two lines 23 and 24, of which the line 23 discharges circumferentially in a larger-diameter portion 25 of the bore 21, while the line at the bottom is connected to a smaller-diameter bore portion 26. A shallow bore step 27 is located between the two bore portions 25 and 26.

The hydraulic part 20 has a valve sleeve 29, which is tightly connected to an armature guide tube 31 that is closed by a pole core 30. A longitudinally movable magnet armature 32 is received with a closing body 33 of a seat valve 34 in the armature guide tube 31. A restoring spring 35 is disposed between the pole core 30 and the magnet armature 32 and presses the closing body 33 against a valve seat 36 of the seat valve 34, which seat is embodied in a bottom 37 of the valve sleeve 29. On the bottom and jacket sides, the valve sleeve 29 is provided with openings, not identified by reference numeral, that provide communication between the interior of the hydraulic part 20 and the lines 23 and 24.

To protect the seat valve 34 from foreign bodies that are contained in the fluid delivered through the lines 23 and 24, the filter part 12 is received circumferentially of the valve sleeve 29 in the bore portion 25, while the filter part 13 is located between the sleeve bottom 37 and the bottom of the bore portion 26. A retaining ring 38 is also provided for securing the hydraulic part 20 in the valve block 22. To complete the magnet valve, there is an electromagnetic part, which can be plugged onto the pole core 30 and the armature guide tube 31, but which is not shown in the drawings.

Joining the multi-part filter combination 10 into the stepped bore 21 of the valve block 22 can be done in the following way:

The filter combination is slipped onto the hydraulic part 20, so that the disklike filter part 13 rests on the sleeve bottom 37, and the bottom ring 16 of the filter part 12 engages the jacket of the valve sleeve 29, while the edge, remote from the bottom ring, of the filter part jacket 14 fits over the end portion, toward the valve sleeve, of the armature guide tube 31 (FIG. 2). The hydraulic part 20 is introduced together with the slipped-on filter combination 10 into the bore 21 of the valve block 22. In the process, the filter combination 10 reaches a position shown in FIG. 2, in which the filter part 12 with its bottom ring 16 comes into contact with the bore step 27, and the filter part 13 is located in the bore portion 26. In this position, the connecting ribs 17 come to rest between the two filter parts 12 and 13, in the mouth 39, which is slightly chamfered toward the bore step 27, of the smaller-diameter bore portion 26. Upon further motion of the hydraulic part 20 into the bore 21, the filter part 12 is restrained at the bore step 27 while the connecting ribs 17 are severed and the filter part 13 is positioned by the sleeve bottom 37 of the valve sleeve 29 on the bottom of the bore portion 26. The mouth 39 thus acts as a shearing or severing point for the connecting ribs 17, in order to separate the two filter parts 12 and 13, so that they can assume their respective final positions, shown in FIG. 3, in the bore. The shearing-off operation can be done without disruption if the sleeve bottom 37 engages the filter part 13 peripherally or over its full surface, and if the outer diameter of the part of the valve sleeve 29 to be introduced into the bore portion 26 corresponds to the inside diameter of this bore portion or has an oversize, in order to produce a press fit, which prevents any connection of the two lines 23 and 24 that would bypass the hydraulic part 20.

In a departure from the exemplary embodiment, the filter combination 10 can also be joined into a fluid-carrying component used in some other way. The filter combination 10 can then be positioned as an individual part, as shown in FIG. 2, in the component. A workpiece that is to be joined into the component can be disposed in the component in a way corresponding to the aforementioned hydraulic part 20 and can take on the separation of the filter parts 12 and 13 and their positioning in their respective final positions in the same way. Instead of the workpiece that remains in the component, a die can also be used, which severs the filter combination 10 and positions its filter parts 12 and 13 and is then retracted in a reverse stroke.

The foregoing relates to a preferred exemplary embodiment of the invention, it being understood that other variants and embodiments thereof are possible within the spirit and scope of the invention, the latter being defined by the appended claims.

We claim:

1. In a multi-part filter combination (10), which is disposed in a stepped bore (21) of a fluid-carrying component (22) and from which a larger-diameter filter part (12) is associated with a larger-diameter bore portion (25), and a smaller-diameter filter part (13) is associated with a smaller-diameter bore portion (26), the improvement wherein the two filter parts (12, 13) of the filter combination (10) are connected by at least one connecting part (17), which when the two filter parts (12, 13) are joined in their respective final position in the bore (21) is detachable by means of a die (20) to be introduced into the bore.

2. The filter combination according to claim 1, wherein the connecting part is formed by a wall extending between the two filter parts (12, 13), or by a plurality of ribs (17).

3. The filter combination according to claim 1, wherein the die (20) is a workpiece to be joined into the bore (21) of the component (22).

4. The filter combination according to claim 1, wherein the larger-diameter filter part (12) is braced on a step (27) of the bore (21), while the smaller-diameter filter part (13) engages the smaller-diameter bore portion (26), and the mouth (39) of this bore portion (26) forms a shearing or severing point for the connecting part (17).

5. The filter combination according to claim 2, wherein the filter combination comprises a sleevelike, larger-diameter filter part (12) and a disklike, smaller-diameter filter part (13), which are disposed coaxially to one another and which with the connecting part (17) form a cup-shaped body, whose bottom is essentially the disklike filter part (13) and the connecting part (17).

\* \* \* \* \*